United States Patent [19]

Fitch, Jr.

[11] Patent Number: 4,771,726

[45] Date of Patent: Sep. 20, 1988

[54] APPARATUS FOR DISPENSING FLOWABLE MATERIALS

[76] Inventor: Clifford E. Fitch, Jr., R.R. #2–Box 74 C, Beecher, Ill. 60401

[21] Appl. No.: 45,282

[22] Filed: May 4, 1987

[51] Int. Cl.$^4$ .............................................. B05C 5/02
[52] U.S. Cl. ..................................... 118/25; 118/411; 222/309; 222/334; 222/380
[58] Field of Search .................. 118/25, 411; 222/380, 222/309, 334

[56] References Cited

U.S. PATENT DOCUMENTS

| | | | |
|---|---|---|---|
| 3,547,052 | 12/1970 | Artiaga et al. | 118/25 X |
| 3,851,801 | 12/1974 | Roth | 222/380 X |
| 4,467,943 | 8/1984 | Carse | 222/309 |

Primary Examiner—John P. McIntosh
Attorney, Agent, or Firm—Wallenstein, Wagner, Hattis & Strampel, Ltd.

[57] ABSTRACT

Apparatus for automatically dispensing a flowable material, especially an edible flowable material, especially an edible flowable material such as a sauce on an object such as pizza dough preparatory to making the end product. The apparatus includes air-pressure actuated reciprocatable piston means associated with valve means for channeling a flowable material from a source thereof to dispensing means provided in the apparatus. Piston stroke limiting means, as well as sealing means for the dispensing means, are provided to selectively control the amount of flowable material dispensed by the apparatus. The apparatus advantageously is associated with conveyor means and meat dispensing means to enable a product such as pizza to be prepared on a continuous, mass production basis.

19 Claims, 5 Drawing Sheets

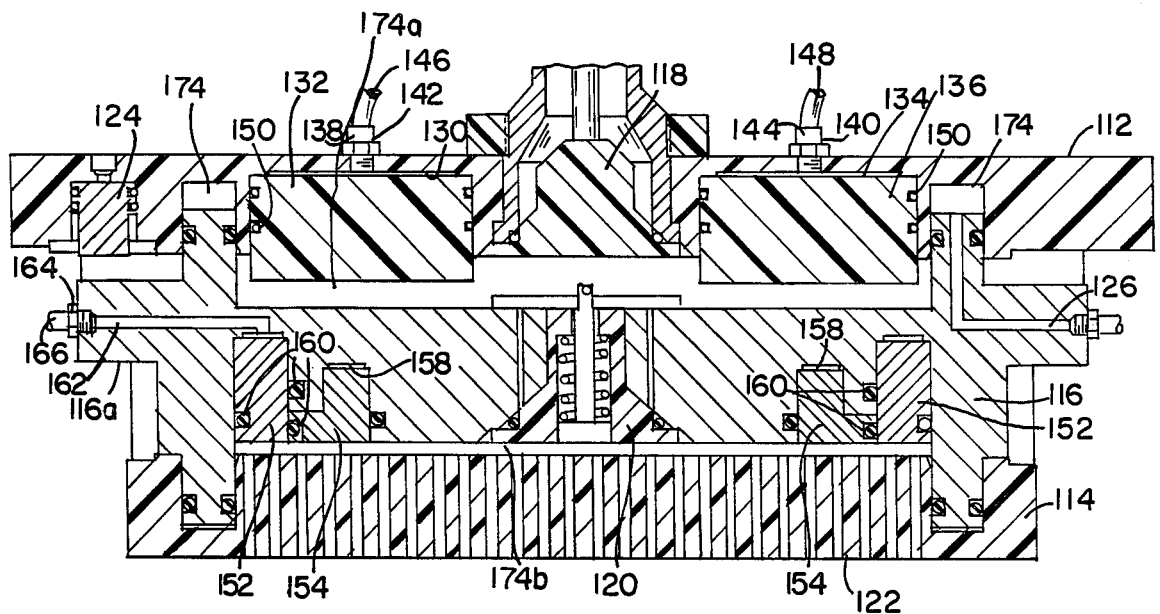

APPARATUS FOR DISPENSING FLOWABLE MATERIALS

FIELD OF THE INVENTION

The present invention relates to automatic apparatus for dispensing a preselected quantity of a flowable material, especially an edible flowable material, on either a prepared food product, or a food product to be prepared with the flowable material as an essential component of the final product.

BACKGROUND OF THE PRIOR ART

Hand operated, or pump action type dispensers for applying a liquid or semi-liquid food product such as tomato sauce on a thin layer of dough used in the making of pizza, for example, are employed in numerous fast-food establishments. Apart from the cumbersomeness of such dispensers, they are slow acting, and the quantity of product dispensed through the restricted outlet of the dispenser can vary depending upon the speed of the operator.

In U.S. Pat. No. 2,849,159 there is disclosed a dispenser for liquids, gases, powders and other flowable forms of material which employs a solenoid actuated bellows to receive and eject measured quantities of a given material. The weight of the plunger acts upon the bellows to open it and to draw a quantity of material from a reservoir. When the solenoid is activated, the solenoid plunger compresses the bellows and causes it to eject its contents through a tube. As in the case of the hand operated dispensers, the dispenser of the patent is slow acting in that it is dependent upon gravity to return the bellows to its open position. Such an arrangement makes it unsuitable for use in a high speed production line type operation. Also, as in the case of hand operated dispensers, the dispenser of the patent utilizes a restricted outlet to eject material from the bellows making the use of the dispenser for uniformly applying tomato sauce on the surface of pizza dough, for example, impractical. A further important shortcoming of such prior dispensers centers on the fact that they cannot be easily disassembled for cleaning, and even when disassembled, the parts thereof which come into contact with the flowable material are difficult to purge of all of the material.

BRIEF SUMMARY OF THE INVENTION

In accordance with the present invention, automatic apparatus for dispensing flowable materials on an object, such as pizza dough, is provided which is uniquely suitable for use in a high-speed, mass production operation. The apparatus is compact, easy and safe to operate, and its simple, yet rugged construction, enables it to dispense a flowable material for prolonged periods with minimum personnel and maintenance requirements. What is more, the apparatus can be easily disassembled for cleaning without the need for a tool, and all components of the apparatus lend themselves to easy, and thorough, removal of all material used in the apparatus. The apparatus consistently and uniformly dispenses a preselected quantity of a flowable material, and can be adjusted to dispense the material on the entire surface of an object, or on a predetermined limited area only thereof. This feature of the apparatus, in those instances, where it is employed, for example, in the production of pizza, enables it to be used to make pizzas of different sizes.

Briefly, the apparatus comprises means for connecting it to a source of flowable material, and a housing in communication with said source. The housing defines a cylinder for reciprocatingly receiving a reciprocatable piston. The piston divides the cylinder into an upper flowable material receiving chamber and a lower flowable material receiving chamber. Valve means is provided between the flowable material source and the upper chamber of the cylinder. The piston carries valve means which interconnects the upper chamber with the lower chamber of the cylinder. A perforated dispensing member is positioned below the lower chamber for directing a preselected quantity of flowable material on an object advantageously carried on conveyor means associated with the apparatus. Means, including passageways formed in the housing, are provided for alternately introducing air under pressure into the upper and lower chambers of the cylinder to cause flowable material from the source to first enter the upper chamber, and then the lower chamber through the valve means. Flow of pressured air into the chambers advantageously is controlled by means of a solenoid. The apparatus further includes means for selectively controlling the volume of flowable material dispensed on an object. In a preferred embodiment of the apparatus, reciprocatable piston engaging means is employed to alter the volume of the lower chamber of the cylinder by urging the main reciprocatable piston in the cylinder in the direction of the dispensing member. The piston engaging means is in communication with closed hydraulic means provided with adjusting means for regulating the amount of pressure exerted on the piston engaging means by the fluid contained in the closed hydraulic means. An added important feature of the apparatus is the provision of blockage means in the housing for selectively sealing off perforations of the dispensing member thereby to restrict the passage of flowable material from the dispensing means through unblocked perforations only. This arrangement enables the apparatus to be used with equal facility to make pizzas of different sizes.

The foregoing, and other features and advantages of the apparatus will become apparent to those skilled in the art upon reference to accompanying detailed description of the invention, the claims, and the drawings.

BRIEF DESCRIPTION OF THE DRAWINGS

FIG. 6 is a vertical sectional view of said embodiment of the apparatus showing the blockage means for the dispensing member; and FIG. 7 is a view corresponding to the view of FIG. 6 showing one of the rings comprising the blockage means in a sealing or blocking position with relation to perforations in the dispenser member.

DETAILED DESCRIPTION OF THE INVENTION

Figure 2:
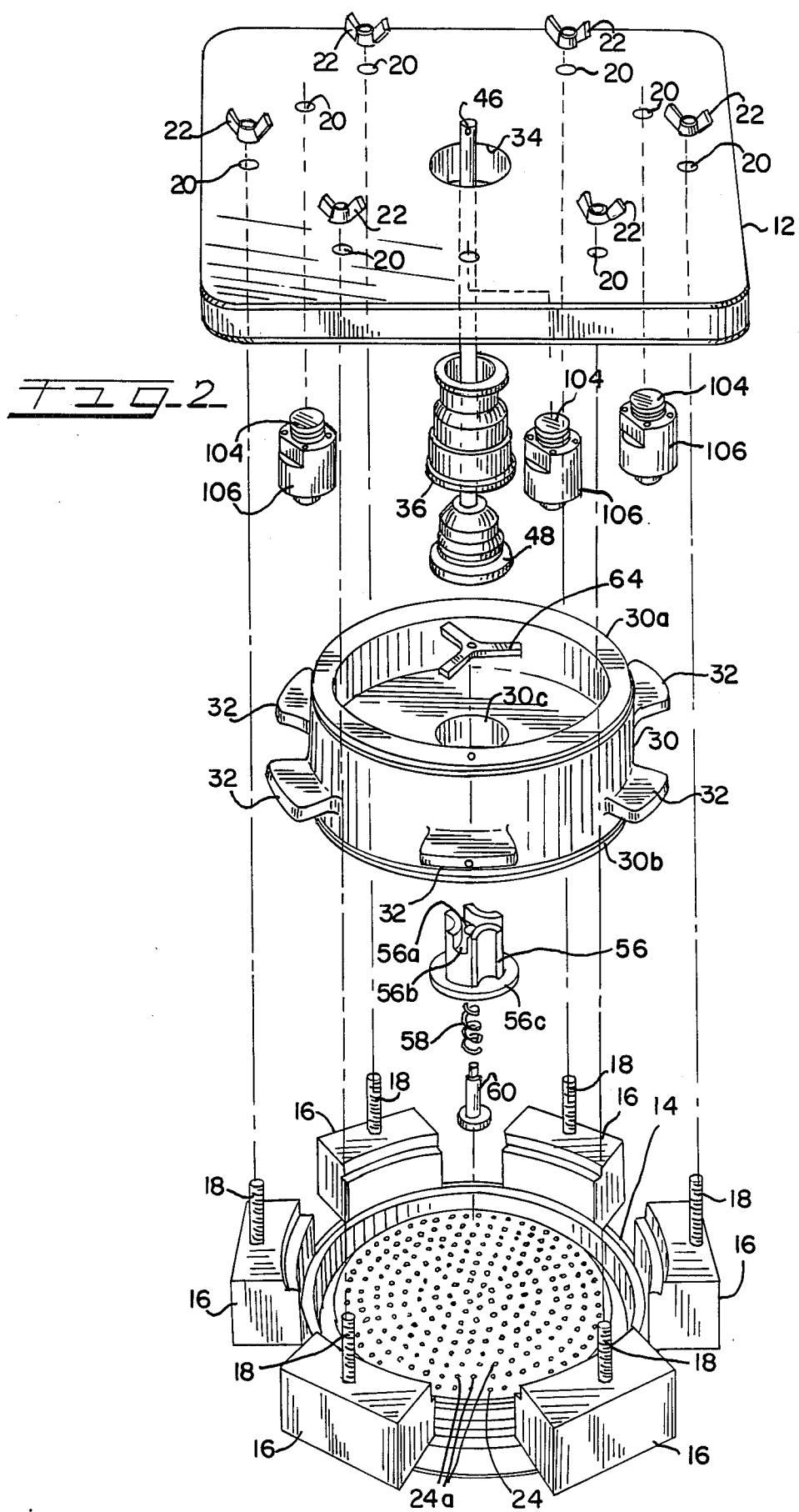
FIG. 2 is an exploded view of said embodiment of the invention.
Figure 3:
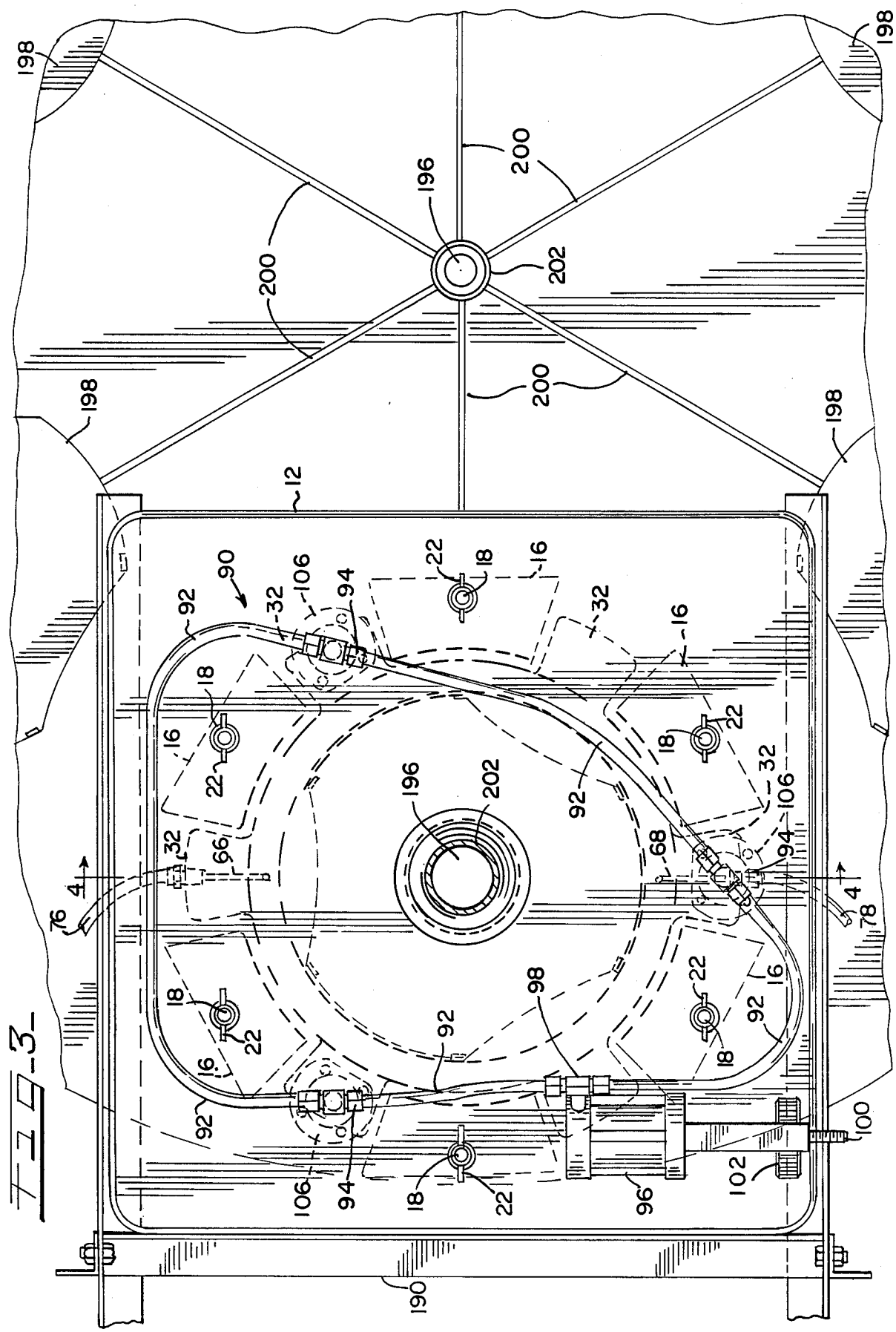
FIG. 3 is a fragmentary top plan view of said embodiment of the invention showing the apparatus in association with conveyor means for dough used in making pizza.
Figure 4:
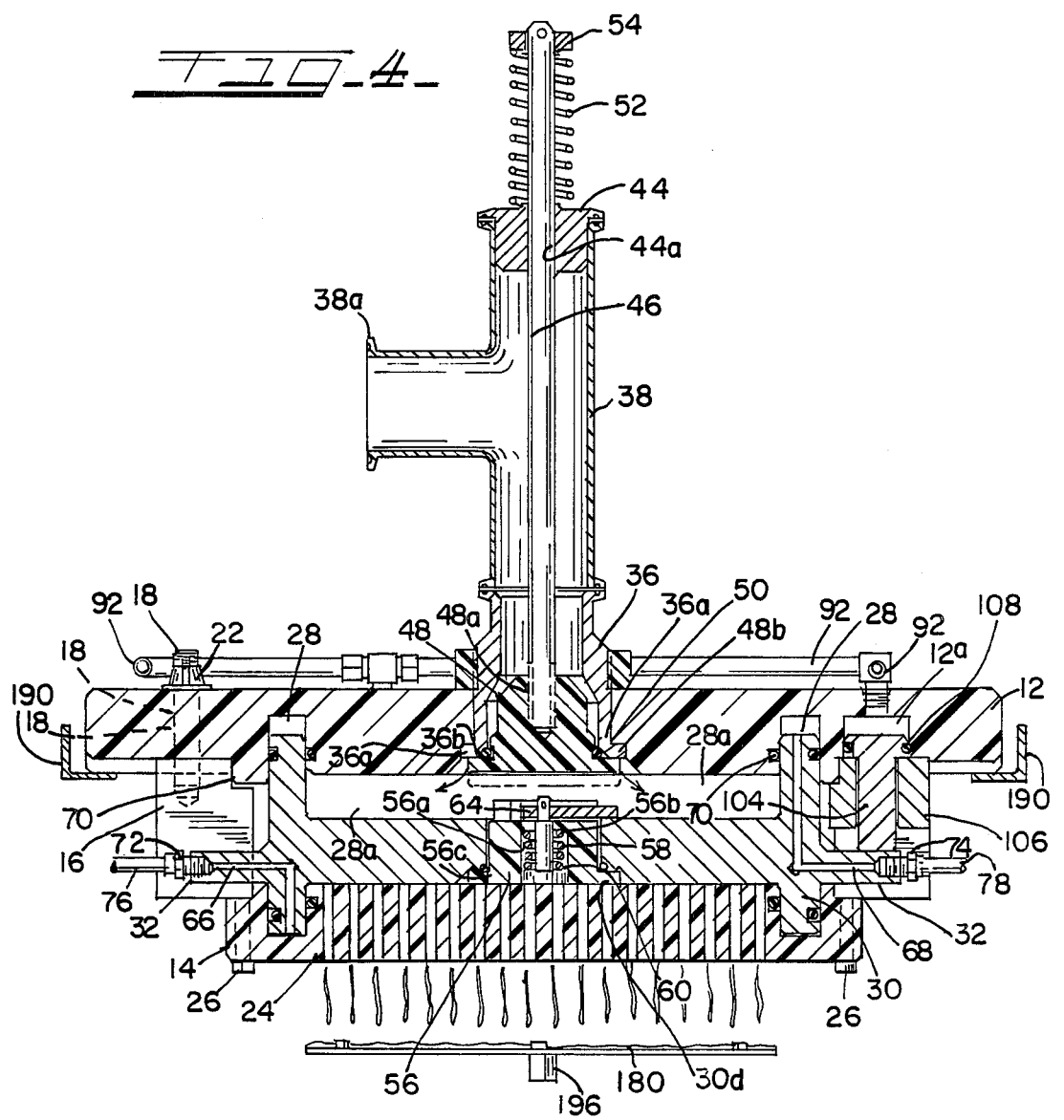
FIG. 4 is a sectional view taken substantially along line 4—4 of FIG. 3.

Referring, now, in particular to FIGS. 2, 3 and 4 of the drawings, the embodiment of the apparatus illustrated, and designated generally by reference numeral 10, comprises a top or upper plate 12 and a bottom or lower plate 14. The bottom plate 14, as shown, is provided with a plurality of spaced, circumferentially arranged joiner sections 16. Each of the joiner sections 16 advantageously is provided with a centrally located tapped bore for receiving an upwardly extending, externally threaded connector pin 18. The pins 18 are adapted to be received in correspondingly spaced openings 20 provided in the top or upper plate 12. Wing nuts 22 are desirably employed to releasably secure the top or upper plate 12 to the joiner sections 16 of the bottom or lower plate. The use of wing nuts enables the apparatus to be easily and readily disassembled, without the need for a tool, to enable all parts of the apparatus which come into contact with a flowable material to be thoroughly cleaned. The bottom or lower plate 14 further comprises a perforated dispensing member 24 which is secured to the base of the joiner sections 16 by means of screws 26. As illustrated, the perforations 24a of the dispensing member 24 are substantially uniform in diameter and are distributed substantially over the entire area of the member 24.

The top or upper plate 12 and the bottom or lower plate 14 define a cylinder 28 for receiving a reciprocatable piston 30. The piston 30, as shown, is generally "H" shaped in cross-section, and serves to partition the cylinder 28 into an upper flowable material receiving chamber 28a and a lower flowable material receiving chamber 28b. The piston 30, between the upper and lower flanges 30a and 30b thereof, is provided with a plurality of spaced, circumferentially arranged, outwardly extending cam members 32 adapted to be received between the spaces between the joiner sections 16 of the bottom or lower plate 14.

Figure 5:
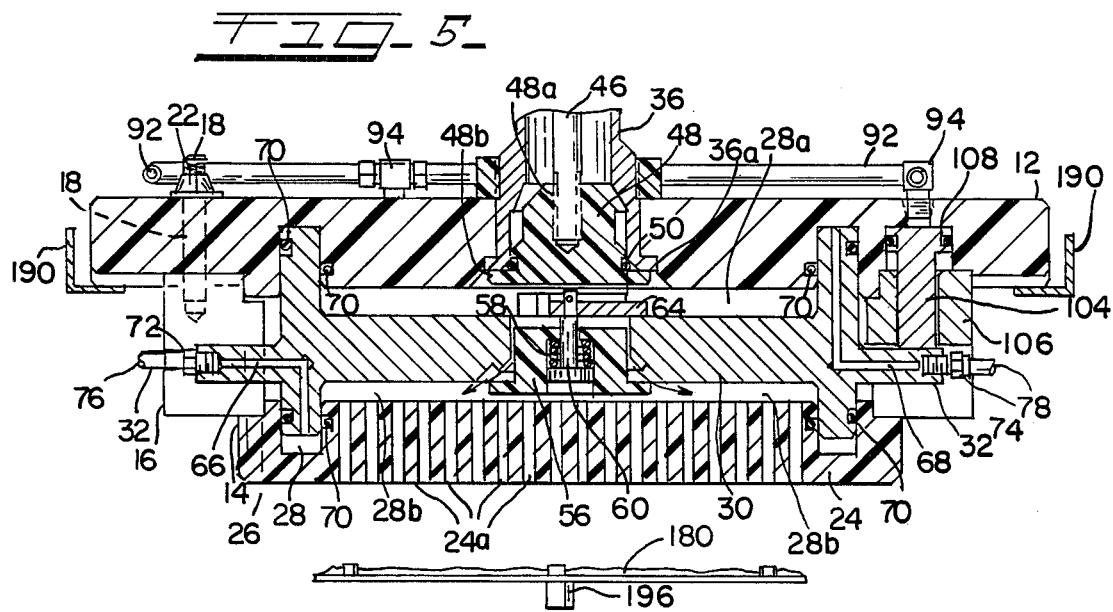
FIG. 5 is a view corresponding to the view of FIG. 4 showing the reciprocatable piston in its raised position.

The top or upper plate 12 has a centrally located opening 34 formed therein for receiving in fluid tight relation an adapter 36. A generally "T" shaped conduit 38 for flowable material is secured to the upper end of the adapter 36. The outwardly extending arm 38a of the conduit 38 is in communication with a source 40 (see FIG. 1) of a flowable material 42. The upper end of the conduit 38 receives a plug or cap seal 44 having a central bore 44a therethrough. An elongated valve stem 46 extends through the bore 44a and the vertical portion of the conduit 38. The lower end of valve stem 46 is threadedly engaged in a tapped bore 48a formed in the upper end of a valve 48. The valve 48 has an annular flange 48b formed at its lower end which seats against an annular flange 36a formed at the lower end of the adapter 36. A sealing member such as "O" ring 50 is positioned in an annular recess 48c formed adjacent to the flange 48b of the valve 48. The "O" ring is adapted to engage the beveled inner margin 36b of the annular flange 36a of the adapter 36 to provide a fluid tight seal when the valve 48 is in its normally seated position as shown in FIG. 5. The valve 48 advantageously is maintained in a normally seated position by a compression spring 52 carried on the upper end of the valve stem 46. A spring retainer 54 desirably is employed to hold the lower end of the spring 52 in abutting engagement with the upper surface of the cap seal 44.

The piston 30 has a central bore 30c formed therein for receiving a piston valve 56. The valve 56 is provided with a central bore 56a which terminates in a shoulder 56b against which the upper end of a compression spring 58, carried on a valve stem 60, abuts. The valve 56 has an annular flange 56c formed at the lower end thereof which is received in an annular recess 30d provided in the lower wall of the central or web portion of the piston 30. Sealing means such as "O" ring 62 is positioned on the valve 56. As shown, the lower margin of the bore 30c of the piston 30 is beveled to provide a fluid tight seal between the "O" ring 62 and the bore 30c when the annular flange 56c of the valve 56 is seated in the annular recess 30d of the piston 30.

As best illustrated in FIG. 2, the wall of the valve 56 above the flange 56c is fluted, and is formed at its upper end with a generally "Y" shaped channel 56d for receiving a correspondingly shaped valve cap 64. The valve cap 64 has a central bore 64a by means of which it is positioned on the upper end of the valve stem 60. The fluted construction of the walls of the valve 56, together with the shape of the valve cap 64 facilitate passage of the flowable material from the upper chamber 28a to the lower chamber 28b defined by the piston 30.

As shown in FIGS. 4 and 5, passageways 66 and 68 are provided in the piston 30 for introducing air under pressure into the cylinder 28. The passageways 66 and 68 advantageously extend through diametrically opposed cam members 32 of the piston 30. As shown, the passageway 66 is angled downwardly so as to convey air under pressure into the cylinder 28 below the piston 30. The passageway 68 is angled upwardly to convey air under pressure into the cylinder 28 above the piston 30. Sealing means such as "O" rings 70 prevent pressurized air from entering the chambers 28a and 28b as the piston 30 moves downwardly and upwardly in the cylinder 28. Fittings 72 and 74, respectively, are attached to the inlet end of the passageways 66 and 68. Flexible conduits 76 and 78, in turn, are connected to the fittings 72 and 74. The conduits 76 and 78 are connected to a pneumatic solenoid housed in a control box 80 (See FIG. 1). The solenoid is in communication with a source (not shown) of air under pressure through a conduit 82.

In the embodiment of the invention illustrated, the volume of flowable material entering the chambers 28a and 28b can be selectively controlled by adjustment of a unique, closed hydraulic system. The system, designated generally by reference numeral 90 in FIGS. 1 and 3, comprises a plurality of conduit sections 92 interconnected by a plurality of "T" fittings 94, and joined to a fluid containing reservoir 96 by a similar fitting 98. The fluid pressure in the closed system is regulated by means of an adjustable, externally threaded rod 100 connected to a piston (not shown) in the reservoir 96. A knurled adjustment knob 102 is carried on the rod 100 for ease in adjusting the pressure in the system. Each of the fittings 94 is connected to a limit piston 104 positioned in a piston guide 106 secured to the under surface of the top or upper plate 12 below cylinders 12a formed therein. In the embodiment illustrated, three limit pistons 104, spaced at approximately a 60° angle with relation to one another, are provided on the plate 12.

As shown in FIGS. 4 and 5, the base of each limit piston 104 is in contact with a different cam member 32 of the piston 30. By adjusting the fluid pressure in the closed system, the stroke of the reciprocatable piston 30 can be increased or decreased thereby controlling the volume of flowable material discharged from the chamber 28b on the downstroke of the piston 30. "O" rings 108 desirably are positioned on the upper end of each limit piston 104 to provide a fluid tight seal between the pistons 104 and the cylinders 12a formed in the top or upper plate 12.

A further unique feature of the dispensing apparatus 10 of the present invention is illustrated in FIGS. 6 and 7. The embodiment of the invention there shown enables the apparatus to be used to apply flowable material to objects, such as pizza dough, of different sizes. Thus, for example, if it is desired to employ the apparatus for making pizzas of either 9 inches or 12 inches in diameter, the arrangement illustrated in FIGS. 6 and 7 is especially adapted to achieve such a result. As in the case of the embodiment of the apparatus 10 described hereinabove, the embodiment of the apparatus, designated generally by reference numeral 110, shown in FIGS. 6 and 7 comprises a top or upper plate 112, a bottom or lower plate 114, and a reciprocatable piston 116. The valve 118 carried by the top or upper plate 112, and the valve 120 carried by the piston 116 are structurally and functionally equivalent to the valves 48 and 56 shown in FIGS. 4 and 5, and, therefore, no detailed description of the valves 118 and 120 is required here. Similarly, the construction and operation of the bottom or lower plate 114, and its associated dispensing member 122 are equivalent to the plate 14 and the dispensing member 24 of the apparatus 10 as described hereinabove. The limiting pistons 124, and the passageways 126 and 128 of the apparatus 110 also are the equivalent of the pistons 104, and the passageways 68 and 66 of the apparatus 10.

The top or upper plate 112 of the apparatus 110 is formed with two sets of three equally spaced cylinders for reciprocatingly receiving a corresponding number of reciprocatable pistons. The cylinder 130 and its associated piston 132 represent one member of one set, while the cylinder 134 and its associated piston 136 represent one member of the second set. Each of the cylinders 130 and 134 are in communication with a low pressure source of air (not shown) through fittings 138 and 140, respectively, secured in openings 142 and 144 in the plate 112, and connected to conduits 146 and 148. "O" rings 150—150 advantageously are provided for the pistons 132 and 134 to assure a fluid tight seal between pistons and the walls of cylinders 130 and 132.

The reciprocatable piston 116, as shown, is provided with a pair of independently reciprocatable blocking rings 152 and 154 positioned in annular cylinders 156 and 158, respectively, formed in the piston 116. Sealing means such as "O" rings 160—160 advantageously are carried by the rings 156 and 158 to provide a fluid tight seal. One of the cam members 116a of the piston 116 has a passageway 162 formed therein which is in communication with the cylinder 156 (See FIG. 6). A fitting 164 is connected to the passageway 162 for receiving the end of a conduit 166 in communication with a source (not shown) of air under pressure. Another cam member 116b of the piston 116 is provided with a passageway 168 which is in communication with the cylinder 158. A fitting 170 is connected to the passageway 168, and is in communication through a conduit 172 with the same source of air under pressure as is the cylinder 156. The piston 116, like the piston 30, partitions a main cylinder 174 formed by the plates 112 and 114 into an upper cylinder 174a and a lower cylinder 174b.

The operation of the apparatus 10 and the apparatus 110 in dispensing a flowable material on an object such as dough 180 (see FIGS. 4 and 5) is basically the same. Thus, referring only to the apparatus 10, when the pneumatic solenoid valve housed in the control box 80 is energized, air under pressure is directed into the cylinder 28 through the passageway 68 causing the piston 30 to move downwardly. As a result the volume of the upper chamber 28a is increased. The valve 48 then opens allowing flowable material 42 from the source 40 to fill the chamber 28a. When the chamber 28a is filled, the valve 48 is returned to its normally seated position by the action of the compression spring 52. The solenoid valve is then deenergized, causing air under pressure to be directed through the passageway 66 into the chamber 28 below the piston 30 while at the same time exhausting air in the cylinder 28 above the piston 30 to atmosphere. As a result, the piston 30 moves upwardly causing the valve 56 to open against the action of the compression spring 58. The upward movement of the piston decreases the volume of the upper chamber 28a and increases the volume of the lower chamber 28b. The flowable material 42 in the chamber 28a is thus displaced into the lower chamber 28b. Energization of the solenoid valve again causes the piston 30 to move downwardly, forcing the flowable material 42 now in the lower chamber 28b to pass through the perforations 24a in the dispensing member 24 onto the pizza dough 180. The cycle is automatically repeated until the apparatus is turned off. The volume of the chambers 28a and 28b, and concomitantly, the volume of flowable material passing into and out of the chambers can be controlled by increasing or decreasing the pressure on the limit pistons 104 by means of the closed hydraulic system as described hereinabove.

When it is desired to make pizzas of smaller size than the size normally made with the apparatus 10 as illustrated in FIGS. 4 and 5, air from a low pressure source is directed into the equally spaced cylinders 130 comprising one of the two sets provided on the plate 112. This causes the three pistons 132 of that set to engage the reciprocatable main piston 116 thereby limiting the volume of the upper chamber 174a of the cylinder 174. At the same time, air under pressure is directed through the passageway 162 into the cylinder 156 causing the blocking ring 152 to engage and seal-off the perforations 122a along the outer margin of the dispensing member 122. The movement of the piston 116, and the operation of the valves 118 and 120, then takes place as in the case of the apparatus 10 described hereinabove. In order to return the ring 152 to a normal, non-blocking position, a vacuum is induced in the cylinder 156 through the passageway 162.

If it is desired to prepare even smaller pizzas, the pistons 132 of one set of three pistons, and the pistons 134 of the second set of three pistons, are forced by low pressure air introduced through the fittings 138 and 140, into engagement with the piston 116 thereby limiting the volume of the chamber 174a of the cylinder 174 by an amount corresponding to the area occupied by the pistons 132 and 134 in the chamber 174a. At the same time, air under pressure is introduced through passageways 162 and 168 into the cylinders 156 and 158, respectively, causing the blocking rings 152 and 154 to be forced into contact with the top of the dispensing member 122. As a result, the number of perforations 122a through which a flowable material can be dispensed onto an object such as pizza dough corresponds substantially to the diameter of the end product desired to be made with the apparatus. The rings 152 and 154 can be returned to a normal, non-blocking position by inducing a vacuum in the cylinders 156 and 158 through the passageways 162 and 168.

Figure 1:
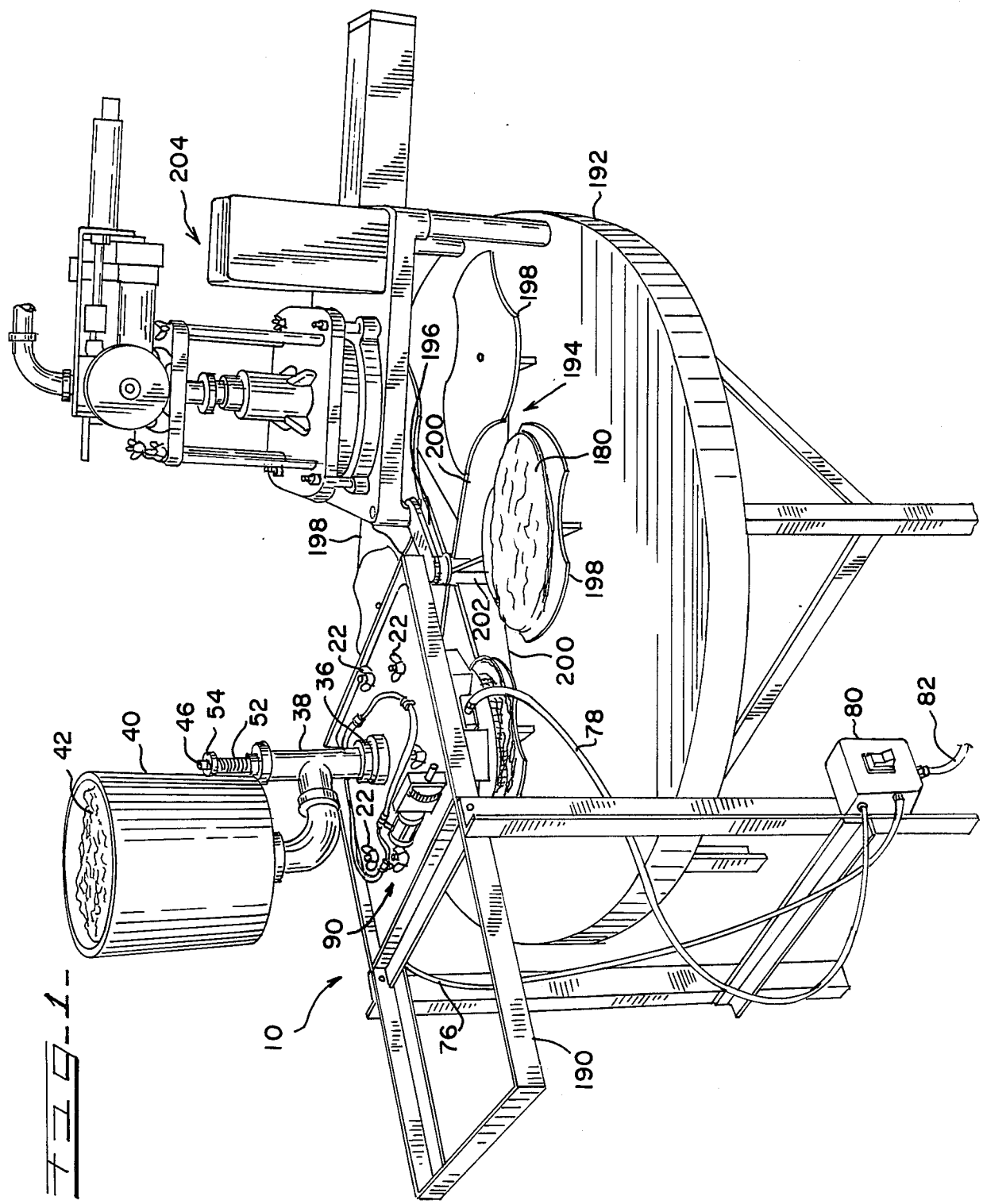
FIG. 1 is a view in perspective of an embodiment of the apparatus of the present invention showing it being used in an automated pizza production operation in combination with a pizza meat dispenser.

As stated, the apparatus of the present invention is especially adapted for use in a high-speed mass production-type pizza preparation operation. In FIG. 1 of the drawings, an example of an arrangement for preparing pizzas with the apparatus is illustrated. The apparatus 10 is mounted on a frame 190 adjacent to a table 192 which supports a conveyor 194 mounted for rotation on a motor driven spindle 196 supported for rotation in an opening in the center of the table 192. The conveyor 194, as shown, comprises a plurality of equally spaced plate members 198 connected by arms 200 to a sleeve 202 carried on the upper end of the spindle 196. An automatic meat dispensing unit 204 is supported on the table 192 in a position such that meat can be applied to the pizza dough 180 carried on the plate members 198 after a flowable material 42 such as tomato paste has been applied to the dough by the apparatus 10. The movement of the conveyor, and the operation of the apparatus 10 and the unit 204 are controlled in a manner to position a plate member 198 under the apparatus 10 and the unit 204 at the same time. Dispensing of the flowable material 42 and meat on the dough 180 takes place in a fraction of a second. The dough, with the tomato paste and the meat in place on it, can then be automatically transferred from the conveyor 194 to an oven to complete the preparation of the end product.

While for purposes of illustration, preferred embodiments of the invention have been described, other forms of the invention may become apparent to those skilled in the art, and, therefore, this invention is to be limited only by the scope of the appended claims.

What is claimed is:

1. Apparatus for dispensing a preselected quantity of a flowable food material onto an object, comprising: a source of a flowable food material; a housing defining a chamber, said chamber being in communication with said source of flowable food material; a source of air under pressure in communication with said chamber; a reciprocatable piston positioned in said chamber and freely movable therein, said piston acting to form said chamber into an upper flowable food material receiving portion and a lower flowable food material receiving portion, the reciprocatable movement of the piston being controlled by the alternate introduction of air under pressure directly into said chamber above and below said piston; means including passageways for alternately introducing air under pressure directly into the chamber above and below the piston to cause flowable food material from the source thereof to first enter said upper portion of the chamber and then said lower portion of the chamber; valve means between said source of flowable food material and the upper portion of the chamber for enabling flowable food material to pass into the upper portion of the chamber when air under pressure is directly introduced into the chamber above the piston; valve means carried by the piston for enabling flowable food material from said upper portion of the chamber to enter the said lower portion of the chamber when air under pressure is directly introduced into the chamber below the piston; and dispensing means for directing a preselected quantity of flowable food material in the lower portion of the chamber onto an object.

2. Apparatus according to claim 1 wherein the dispensing means comprises a substantially flat perforated plate member.

3. Apparatus according to claim 1 wherein piston engaging means is provided for controlling the extent of the reciprocatable movement of the piston in said chamber whereby the quantity of flowable food material dispensed by the apparatus can be selectively regulated.

4. Apparatus according to claim 3 wherein said piston engaging means includes a sealed hydraulic system in communication with a plurality of reciprocatable limit pistons for engaging the reciprocatable piston positioned in the chamber.

5. Apparatus according to claim 4 wherein the sealed hydraulic system includes a fluid reservoir the volume of which can be selectively adjusted to regulate the movement of the limit pistons in relation to the reciprocatable piston in the chamber.

6. Apparatus according to claim 1 wherein a pneumatic solenoid valve is provided for alternately introducing air under pressure into the chamber first above and then below the reciprocatable piston.

7. Apparatus according to claim 1 wherein the valve means between the source of the flowable food material and the upper portion of the chamber includes a spring biased valve stem for normally maintaining the valve means in a seated position.

8. Apparatus according to claim 1 wherein the valve means carried by the reciprocatable piston includes a spring biased valve stem for normally maintaining the valve means in a seated position.

9. Apparatus according to claim 1 wherein blockage means is positioned in the chamber for selectively sealing off an area of the dispensing means whereby a preselected area only of the surface of an object will have flowable food material dispensed thereon.

10. Apparatus according to claim 9 wherein the blockage means includes at least one ring member adapted to seal off an area adjacent to the outer margin of the dispensing means.

11. Apparatus according to claim 9 wherein the blockage means is positioned in the chamber in communication with said source of air under pressure.

12. Apparatus according to claim 11 wherein means including passageways are provided for introducing air under pressure into the chamber for urging the blockage means into a sealing position.

13. Apparatus according to claim 9 wherein the blockage means includes a pair of ring members, and means is provided for moving said members individually, or together, into sealing relation with respect to the dispensing means.

14. Apparatus for automatically dispensing a sauce on pizza dough, comprising: a source of sauce to be dispensed on the dough; an upper plate member; a lower plate member releasably secured to the upper plate member, said upper and lower plate members defining a chamber; a source of pressurized air in communication with said chamber; a reciprocatable piston positioned in said chamber, said piston serving to partition the chamber into an upper sauce-receiving portion and a lower sauce-receiving portion; valve means positioned between said flowable food material source and said upper sauce-receiving portion; valve means positioned between said upper sauce-receiving portion of the chamber and said lower sauce-receiving portion thereof;

means including passageways for alternately introducing air under pressure directly into said upper portion of the chamber to cause said valve means between said flowable food material source and said upper portion of the chamber to open, and then directly into said lower portion of the chamber to cause said valve means between said upper and said lower portions of the chamber to open; and a perforated sauce dispensing member in communication with the lower sauce-receiving portion of the chamber for directing a predetermined quantity of sauce onto pizza dough.

15. Apparatus according to claim 14 wherein blockage means is provided for enabling preselected areas of the perforated sauce dispensing member to be sealed off thereby to prevent sauce from said lower sauce-receiving portion of the chamber from passing through said sealed off areas.

16. Apparatus according to claim 15 wherein the blockage means includes a plurality of reciprocatable pistons carried on the upper plate member, said reciprocatable pistons being movable under air pressure into contact with the reciprocatable piston in said chamber.

17. Apparatus according to claim 15 wherein the blockage means includes a pair of blocking rings positioned on the reciprocatable piston, said rings being independently, or conjointly movable under air pressure into engagement with the perforated sauce dispensing member.

18. Apparatus according to claim 17 wherein means including passageways are provided in the reciprocatable piston for introducing air under pressure above said rings to move them into and maintain them in engagement with the dispensing member.

19. Apparatus according to claim 14 wherein a meat dispensing unit is associated with the apparatus for dispensing a predetermined quantity of meat on the sauce coated pizza dough.

* * * * *